Dec. 19, 1939.    W. B. STEVENS    2,184,106
LEG-GRIPPING ATTACHMENT FOR MILK PAILS
Filed Dec. 20, 1937
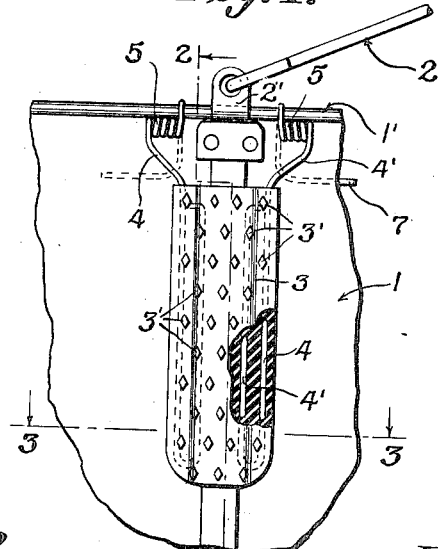
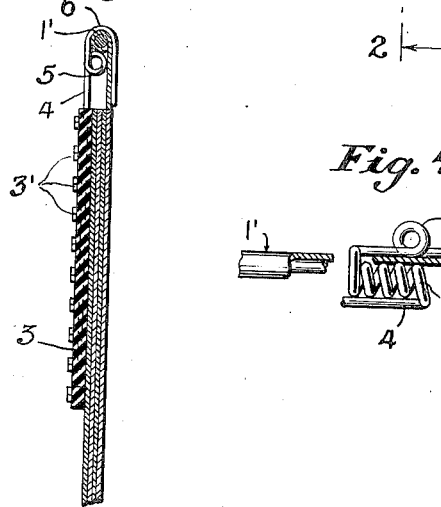
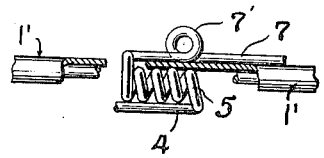
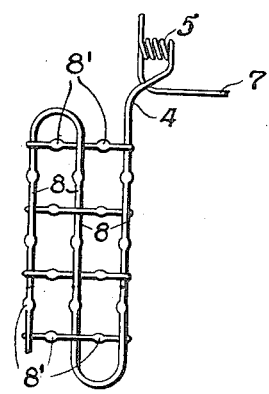
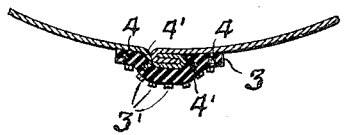
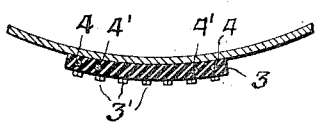
INVENTOR.
Waldo B. Stevens
BY
ATTORNEYS.

Patented Dec. 19, 1939

2,184,106

UNITED STATES PATENT OFFICE 2,184,106

LEG-GRIPPING ATTACHMENT FOR MILK PAILS

Waldo B. Stevens, Tigerton, Wis.

Application December 20, 1937, Serial No. 180,790

1 Claim. (Cl. 31—54)

My invention refers to leg-gripping attachments for milk pails, whereby the pail, when squeezed between the legs in a milking operation, will be frictionally held against slippage, due to the weight of the contents of the pail. I am aware of the fact that milk pails have been constructed embodying therein permanent gripping surfaces having corrugations or the like. Such built-in structures have not proved satisfactory, due to difficulty in sterilization and cost of manufacture of such special pails.

My invention, therefore, embodies an attachment to a milking pail, which can be purchased in open market, and can be readily clipped and held firmly to any standard pail, whereby satisfactory results will be attained.

Obviously, in utilizing such attachments, they can be readily removed for a thorough sterilization process.

A further object of my invention is to provide an attachable set of gripping plates, having fastening means which will positively prevent movement of the gripping plates in a vertical direction, and also in a horizontal direction.

Another object of my invention is to provide in some instances a pliable gripping plate, whereby the same will snugly hug the surface of the pail under all conditions.

With the above and other objects in view, my invention consists in certain peculiarities and combination of parts, as will be hereinafter more fully described and subsequently claimed.

In the drawing:

Figure 1 represents a fragmentary elevation of a milk pail, having fitted thereto a gripping plate embodying features of my invention.

Figure 2 is a longitudinal sectional view of the same, the section being indicated by line 2—2 of Figure 1.

Figure 3 is a cross section of the same, the section being indicated by line 3—3 of Figure 1.

Figure 4 is a detailed fragmentary plan view of one of the yieldable gripping members shown associated with the top of a pail, the same particularly illustrating a modified form of the spring element, whereby means for readily moving the same from the pail is provided.

Figure 5 is a front elevation of a modified form of woven wire reinforcement for the gripping plate, the same being shown in skeleton form eliminating said gripping plate therefrom.

Figure 6 is an enlarged cross sectional view of a gripping plate snugly engaging the unobstructed surface of a pail.

Referring more specifically to the drawing, the numeral 1 indicates a fragment of a milk pail having a bead 1' at the top of the body, and the usual handle 2, said pail being of standard type.

Fitted to the outer wall of the pail is a gripping plate 3 having buttons or knobs 3' projecting from its outer face. This plate is preferably moulded from soft rubber, and in order to reinforce and strengthen the body of the same, the outer longitudinal edges have embedded therein wire strands 4, which, if desired, may be folded upwardly at the bottom of the plate to form a second reinforcing leg 4', but, obviously, in some instances, a single leg strand at either edge may be utilized.

The wire strand 4 extends outwardly from the upper edge of the gripping plate, and is bowed outwardly, as shown, to effectually widen the distance between the companion strands. The spread portion of each strand is formed with an inwardly extended closed coil 5, and the end of this coil extends upwardly to form a clamping loop 6 for engagement with the pail bead 1'. The loop 6 is thereafter extended downwardly in leg form a predetermined distance, and terminates with a horizontally positioned pail-engaging foot 7, which foot is located a predetermined distance from the top of the pail. Hence, it will be seen that these feet and associated portion of the loop strands will form positive inner wall gripping elements for the pail, it being understood that these wire strands are developed from suitably gauged tough spring wire.

From the foregoing description, in connection with the illustrations, it will be observed that the yieldable gripping plate can quickly be attached to the outside walls of the pail, preferably in alinement with the ears 2' of the bail 2. Owing to the spread of the coils with relation to each other and the plate, the points of grip upon the pail bead are positioned at a material distance from the ears, whereby wobbling or side strain upon the associated gripping plate is eliminated to insure rigidity of said gripping plate with reference to the pail walls.

It will also be observed that the coils nest snugly under the pail bead 1' to yieldingly resist movement of the gripping plate in an upward direction with reference to the pail, and the loops 6 perform a similar function to prevent downward movement of the aforesaid gripping plates with relation to the pail. Hence, the gripping plates will be firmly and yieldably attached to the bead portion of the pail, and also the inner and outer walls thereof.

As best shown in Figure 4 of the drawing, the leg 7 of the gripping element may, if desired, be formed by an intermediate loop 7', which loop constitutes an ear to facilitate ready removal of the plate from the pail, it being understood that the operator can readily grasp these finger loops and strip the attachment from the pail when it is desired to properly sterilize the pail, and after the removal of the plates the same can also be properly cleaned, although in some instances these parts may be cleansed without dismantling.

In utilizing a moulded rubber gripping plate, it has been found particularly advantageous, due to the fact that said plate, if positioned over a seam of the pail, as best shown in Figure 3 of the drawing, will conform snugly to the irregular contour of the seam and associated pail wall. Another advantage in utilizing rubber for the gripping plates is that condensation between the engaged surfaces of the pail and plate is eliminated, due to the positive adhesion of the parts, it being understood that in a milking operation the more or less chilled walls of the pail will develop condensation due to the warm body of milk rising within the pail.

While I have particularly emphasized the use of a rubber plate, it is understood that in some instances I may utilize a corrugated plate formed from metal or other substance, in which case the wire strands 4 would be soldered or seamed to the edges of the plate body.

As best shown in Figure 5 of the drawing, I may also form a skeleton reinforcement for the plate from a series of woven wire strands 8. The strands in this instance could readily be stamped with projections or gripping buttons 8', if desired. In the instance wherein the plate is moulded about a wire skeleton mesh, the last strand 4 upon either longitudinal edge of the plate is extended upwardly, and terminates with the spring gripping elements similar to that illustrated in Figure 1 of the drawing.

While I have shown and specifically described my desired form of spring grip members, it is understood that these spring grip members may vary structurally to accomplish the desired results, whereby movement of the plate is positively eliminated in all directions, and it is understood also that while I have shown the gripping elements of the plates positioned on opposite sides and associated with the ears and seam of the pail, these plates may be located in any selected position upon the pail edge. It is also apparent that by utilizing a corrugated or button surface of a rubber plate for positive gripping, slippage of the parts with reference to the gripping strain of the operator is eliminated. Furthermore, these rubber gripping elements will prevent undue wear upon the surface of the milker's garments in said gripping or squeezing operation to hold the pail firmly irrespective of the weight load in said pail.

While I have described and illustrated various arrangements of the removable gripping plates, it is understood that I may vary the structural features of said gripping plates as may come within the scope of the claim.

I claim:

A gripping attachment for pails comprising, a pliable plate and reinforcing wires embedded in said plate having wire terminals extending from the upper portion of the plate, the wire terminals being formed with transversely disposed intermediate coils for engagement with the under surface of a pail bead, and the terminals of said coils forming loops with feet portions for engaging the inner walls of a pail.

WALDO B. STEVENS.